United States Patent

[11] 3,630,216

| [72] | Inventor | Warner M. Kelly |
| | | Houston, Tex. |
| [21] | Appl. No. | 26,628 |
| [22] | Filed | Apr. 8, 1970 |
| [45] | Patented | Dec. 28, 1971 |
| [73] | Assignee | Otis Engineering Corporation |
| | | Dallas, Tex. |

[54] CONDITION-SENSING SAFETY VALVE DEVICES
10 Claims, 5 Drawing Figs.

[52] U.S. Cl.................................................. 137/67,
73/86, 137/75, 137/456
[51] Int. Cl................................................. F16k 17/00
[50] Field of Search........................................... 137/67, 74,
75, 457, 456; 236/93; 73/86

[56] References Cited
UNITED STATES PATENTS

| 2,763,534 | 9/1956 | Campbell.................. | 73/86 X |
| 1,726,721 | 9/1929 | Schullstrom................ | 137/492.5 |
| 2,893,413 | 7/1959 | Nordahl..................... | 137/75 |

Primary Examiner—M. Cary Nelson
Assistant Examiner—Richard Gerard
Attorney—E. Hastings Ackley ABSTRACT: An abrasion, corrosion or erosion-sensitive pilot control for a fluid-operated flow-controlling safety valve in a flow line through which abrasive, corrosive or erosive fluids are flowing disposed in said flow line in the path of such fluids for actuating the valve to cut off flow upon the occurrence of a predetermined condition of corrosion, erosion or abrasion in the flow line to prevent further flow through the flow line. A hollow probe sealing off a closed chamber admits the pressure of the flowing fluids in the flow line to said chamber when its integrity is destroyed to actuate a valve for directing operating fluid from a source of pressure to the valve operator or motor to move the valve to closed position. A pressure-operable valve or a resiliently operable valve may be used for shutting off the flow out through the flow line.

PATENTED DEC 28 1971 3,630,216
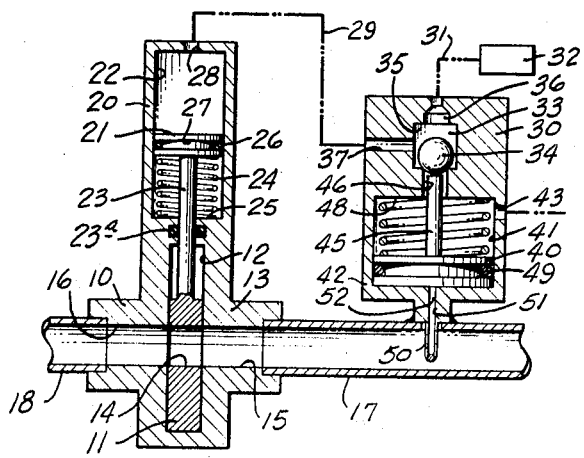
FIG. 1
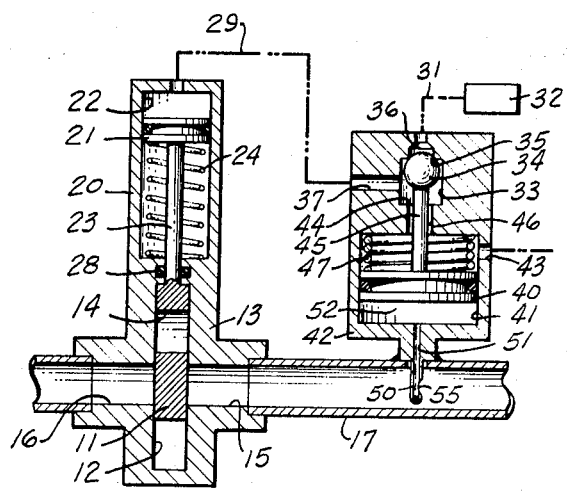
FIG. 2
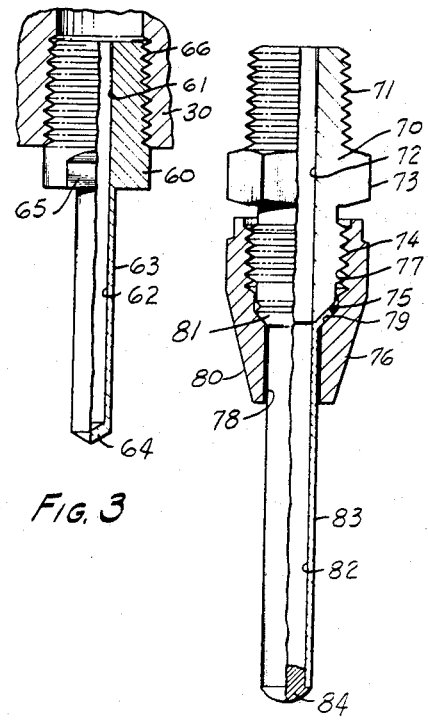
FIG. 3
FIG. 4
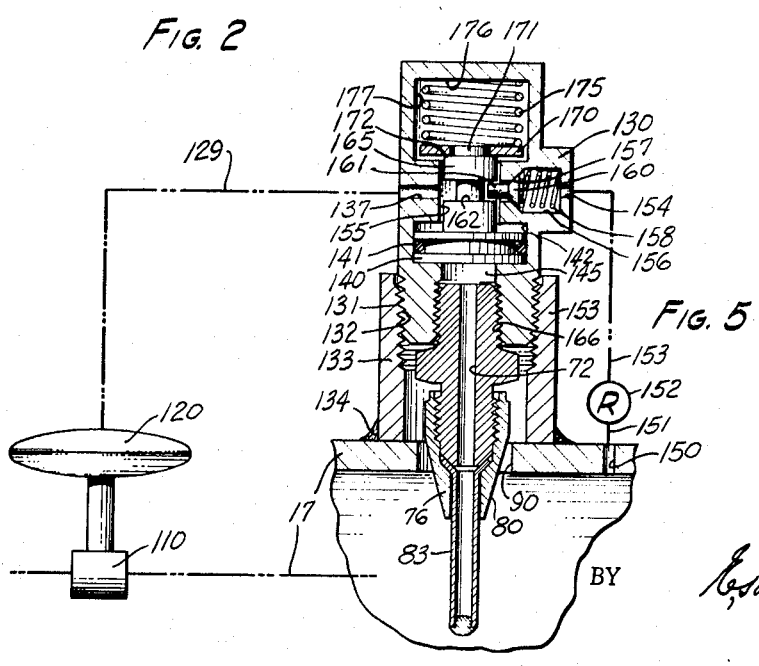
FIG. 5
INVENTOR
Warner M. Kelly
BY E. Hastings Ackley
ATTORNEY

3,630,216

CONDITION-SENSING SAFETY VALVE DEVICES

This invention relates to new and useful improvements in condition-sensing safety valve devices for fluid flow lines for actuating a valve to cut off flow through the flow line on the occurrence of a predetermined condition in such fluids flowing in such flow lines.

It is one object of the invention to provide an improved pilot for safety valves for flow lines conducting fluids containing abrasive, erosive or corrosive materials, wherein the pilot is designed for actuation of the valve upon the occurrence of such predetermined conditions.

A particular object of the invention is to provide a hollow probe arranged to be disposed in a flow line in the path of fluids flowing through the line to be acted thereon by erosive, corrosive or abrasive materials present in such fluids to wear, erode, corrode or be abraded to a condition admitting fluid pressure through the probe to an operating pilot which controls the application of control fluid pressure to a safety valve in the flow line for cutting off the fluid flow through the flow line when the integrity of said probe is destroyed, damaged, or otherwise rendered ineffective to keep the valve open.

A further object of the invention is to provide a probe of the character described formed of a metal, plastic or other material which will withstand a predetermined amount of corrosion, erosion or abrasion by fluids flowing therepast in the flow line and which will yield or fail under such predetermined conditions to admit fluid pressure from the flow line to an operating cylinder and piston to control the admission of operating fluid pressure to the operating piston or diaphragm of the safety valve cutting off flow through the flow line.

Another object of the invention is to provide a probe of the character described wherein the probe part damaged or destroyed by abrasion, corrosion or erosion may be readily replaced and fluid flow through the flow line reestablished and the system placed back into operating condition without undue delay.

Still another object of the invention is to provide in a system of the character described a pilot valve for controlling the admission or flow of control fluid pressure to the piston or diaphragm motor valve or piston-operated valve for controlling the actuation of the valve.

Still a further object of the invention is to provide in a system of the character described means for utilizing a portion of the pressure of the fluids flowing through the flow line for actuating the diaphragm or piston of the safety valve upon damage or destruction of the sensing probe.

A particular object of the invention is to provide a sensing device having a probe responsive to erosion, corrosion or abrasion exposed in a flow line for controlling the application of actuating fluid pressure to a normally open closeable safety valve for controlling the flow of fluids through the flow line upon the occurrence of a condition which damages or destroys the integrity of the probe-sensing device.

Additional objects and advantages of the invention will be readily apparent from the reading of the following description of a device constructed in accordance with the invention, and reference to the accompanying drawings thereof, wherein:

FIG. 1 is a schematic view of a safety valve, pilot valve and sensing-probe system constructed in accordance with the invention and showing the same connected in a flow line with the safety valve held in the open position;

FIG. 2 is a view of the device of FIG. 1 showing the sensing probe damaged and the pilot valve operated to permit the safety valve to move to closed position to close off flow through the flow line;

FIG. 3 is an enlarged view, partly in elevation and partly in section, of the sensing probe of the device of FIG. 1;

FIG. 4 is an enlarged view, partly in elevation and partly in section, of a modified form of the sensing probe of the invention; and, FIG. 5 is a schematic view, partly in elevation and partly in section, showing the sensing device of FIG. 4 connected to a modified form of pilot valve and safety valve.

In the drawings, the numeral 10 designates a gate valve having a slidable gate-closure member 11 movable in the central valve chamber opening 12 of the body 13 of the valve, and shown in open position with the flow passage 14 of the valve closure member communicating with the inlet 15 and outlet 16 of the valve body. A flow line 17 is connected to the inlet opening 15 and a similar flow line 18 is connected to the outlet opening 16 of the valve body. A pressure operator cylinder 20 is connected with the body 13 of the valve and a piston 21 is movable longitudinally of the cylinder bore 22 and is connected by means of a stem 23 with the valve closure 11. An O-ring seal 23a seals between the valve body and the stem. A helical coil spring 24 is disposed in the cylinder bore 22 between the piston 21 and the lower end 25 of the cylinder bore, and biases the piston upwardly of the cylinder bore 22 to bias the valve closure member 11 toward the closed position. The piston 21 has an annular sealing member 26 disposed in an external annular groove 27 in said piston for sealing between the piston and the wall of the cylinder bore 22, whereby fluid pressure introduced into cylinder bore through the inlet opening 28 at the upper end of the cylinder 20 may act on the piston to move the piston downwardly and thus move the closure member 11 downwardly to the open position shown in FIG. 1. The fluid pressure is directed to the inlet 28 by means of a control fluid line 29 connected with a pilot valve 30 and a supply line 31 from a source of control fluid pressure 32, such as an instrument air system, a bottle of gas, or hydraulic fluid pressure in an accumulator.

The pilot valve 30 is shown schematically and has a valve chamber 33 in which a ball valve 34 is movable by gravity away from a closure seat 35 surrounding the inlet 36 from the supply line 32. The outlet conduit 37 formed in the pilot valve body 30 communicates with the conduit 29 leading to the safety valve cylinder bore 22. As shown, the ball valve 34 is moved by gravity downwardly away from the seat 35 and the control fluid from the chamber of source 32 may pass through the supply line 31 into the valve chamber 33 and outwardly through the outlet 37, through the conduit 39 and through the opening 28 into the cylinder bore 22 of the safety valve 10 and so act on the piston 21 to move the same to the lower open position.

An operating piston 40 is disposed in a cylinder bore 41 of a cylinder 42 formed on the pilot valve body 30 and has an elongate operating stem 45 connected therewith and extending upwardly through a passage 46 to a point just below the ball valve 34 when the ball valve is in the open position. A helical coil spring 47 is confined between a shoulder 48 at the upper end of the cylinder bore 41 and the upper end of the piston 40 and biases the piston downwardly to the position shown in FIG. 1. An annular seal 49 is disposed on the piston 40 for sealing between the piston and the wall of the cylinder bore 41. A sensing probe 50 is connected at one end with an opening or port 51 communicating with the cylinder bore 41 beneath the piston 40 and this closed hollow sensing probe 50 together with the passage or port 51 and a portion of the cylinder bore 41 beneath the piston 40 provides a closed chamber 52.

Fluids flowing through the flow conductor 17 will contact the exterior surfaces of the sensing probe 50, and if corrosive, abrasive or erosive materials are present in the fluids flowing through the conduit 17 and contacting the probe 50, upon the occurrence of a predetermined amount of corrosion, erosion or abrasion of the material of which the sensing probe 50 is formed, the probe will be in part disintegrated or worn away as shown in FIG. 2, so that the integrity of the closed chamber 52 is destroyed, whereupon the pressure of the fluids present in the flow line 17 may pass inwardly through the worn opening 55 in the sensing probe and through the port 51 into the cylinder bore 41 beneath the piston 40. Such fluid pressure will move the piston 40 upwardly to move the stem 45 upwardly and lift the ball valve 34 into engagement with the seat 35 to close off the admission of control fluid from the source 32 and the supply line 31 through the port or inlet 36 into the chamber 33 of the pilot valve. At the same time, fluid pressure confined in the piston bore 22 of the valve 10 will be permitted to escape through the port 28, the conduit 29 and the port 37 through the pilot valve chamber 33 and downwardly through the opening 46 through which the operator stem 45 extends and outwardly through an exhaust port or vent port 43 formed in the wall of the cylinder 42 of the pilot valve. The spring 24 in the cylinder bore 22 of the safety valve 10 will then move the piston 21 upwardly to lift the actuating stem or rod 23 and move the valve closure member 11 upwardly to position the imperforate portion of the closure member between the flow inlet 15 and outlet 16 of the valve and close off flow through the valve.

The fluid pressure in the flow line 17 will continue to pass through the worn opening 55 of the sensing probe and the port 51 into the cylinder bore 41 of the pilot valve and act on the pilot piston 40 to maintain the ball valve 34 in position closing off flow of operating fluid or control fluid pressure from the source 32 to the operating piston 21 of the safety valve, so that the valve is maintained in the closed position by the spring 24.

After fluid flow through the flow conduit 17 has been cut off or blocked upstream of the pilot valve and safety valve by another valve connected in the flow line and manually operated to close off access of the fluids in the line 17 to the eroded opening 55 in the pilot probe and the safety valve 10, the damaged pilot valve probe 50 may be replaced and the pressure vented from the cylinder 41 beneath the piston 40, whereupon the spring 47 will move the piston and rod 45 downwardly and permit the ball valve 34 to move downwardly away from the seat 35 to again admit control fluid pressure through the conduits 31 and 29 into the cylinder bore 22 above the operating piston 21 of the safety valve to move the safety valve closure member 11 to the open position against the force of the spring. The ball valve 34, when in its lower position, closes off escape of the control fluid pressure from the chamber 33 through the opening 46 and the vent port 43 by engagement of the ball valve with the seat 44 at the upper end of the passage 46 exposed in the valve chamber 33 at the upper end of the passage 46.

One form of probe of a type suitable for use in the system illustrated in FIGS. 1 and 2 is shown in FIG. 3, wherein an externally threaded body 60 has a bore 61 extending therethrough and communicating with a bore 62 of an elongate tubular metallic or plastic probe body member 63 which is closed at 64 at its end opposite the body 60. Wrench flats 65 are provided on the body for rotating the body to engage the threads of the probe in suitable internal threads 66 in the pilot valve body 30. The probe may be made of copper of any desired hardness or strength, brass, Monel, steel, aluminum, plastic, or other suitable material which will withstand abrasion, erosion, or corrosion for a limited period of time. The thickness of the wall of the tubular probe body section 63, as well as the closed end 64 thereof, will determine the length of time required for abrasive materials to destroy, damage, perforate or penetrate the wall of the probe and so provide an opening to the bore 62 to admit fluid pressure thereinto to act on and operate the piston 40 of the pilot valve. Also, if copper, aluminum or the like is used, a corrosive material such as an acid or an alkali may eat away the wall of the tubular portion 63 of the probe to perforate the same to permit fluid pressure of the fluids flowing through the flow line 17 to enter the bore 62, pass through the bore 61 of the body and act on the piston 40 of the pilot valve. Other materials than copper, steel, aluminum, Monel or brass may be used, if desired. Any suitable material which is subject to abrasion, corrosion or erosion may be used, and the thickness of the wall of such material and its rate of destruction by abrasion, corrosion or erosion will determine the necessary thickness of the wall required to obtain the desired period of delay in operation of the pilot valve 30 and the safety valve 10.

The system and probe are particular suitable for use in flow lines through which sand, alkali or acid flows, and, where a copper, aluminum or plastic material is used, either sand, alkali or acid will erode, corrode or abrade the tubular walls of the probe to penetrate the same to admit the fluid pressure from the flow lines into the interior of the probe to actuate the pilot valve and close the safety valve 10 as has has been described.

A modified form of sensing probe is shown in FIG. 4 wherein the connector bushing or body 70 of the probe is provided with external screw threads 71 on one end adapted to be threaded into the threaded bore 66 of the pilot valve body. The connector body or bushing 70 has a bore 72 extending completely therethrough and a central external hexagonal operating head 73. The opposite ends of the body is formed with external screw threads 74 and a beveled clamping shoulder 75. A clamping thimble or ferrule 76 having internal threads 77 at one end mating with the threads 74 of the bushing or body is threaded onto the threaded end of the body 70 and has a bore 78 which communicates with the bore 72 of the body. This clamping ferrule also has a clamping shoulder 79 provided in its bore between the bore 78 and the enlarged bore in which the threads 77 are formed, and a flared flanged end portion 81 of a tubular-sensing probe body 83, which is shown to be substantially frustoconical in shape is clamped between the shoulder 75 of the body and the shoulder 79 in the ferrule in leakproof sealing engagement with the bushing.

The tubular-sensing probe body 83 has a bore 82 which is closed at its lower end by a closure plug 84 which may be in the form of a body of solder or the like filling and closing the bore at the lower end of the bore 82 of the tubular-sensing probe body. The body of the tubular probe may be of copper or other suitable material and the plug may be of lead and tin solder, silver solder, plastic or other material which will effectively close the lower end of the bore 82 of the body and prevent fluid entry thereinto. The probe assembly and the valve 130, when the bushing 70 is threaded into the pilot valve body opening 166 form a closed chamber 145 in the valve body. The cylindrical tubular body 83 is adapted to be abraded, corroded or eroded in the same manner as the tubular body 63 of the form first described. Obviously, the closure 84 may also be abraded, eroded or corroded by the materials flowing therepast. The ferrule 76 has a tapered lower portion 80 which is adapted to be positioned in a bore or opening 90 formed in the wall of the flow conductor 17, and the pilot valve 130 has external threads 131 on its lower end adapted to be threaded into the internal threads 132 of a collar or adapter 133 welded or otherwise suitably secured as at 134 to the flow conductor 17 surrounding the opening 90. The threads 131 of the pilot valve body 130 dispose the probe in proper position in the flow conductor 17 for exposure to the fluids flowing therethrough.

A control fluid flow port 150 is formed in the wall of the flow conductor 17 and a conduit 151 is connected with the flow port and with a fluid pressure regulator 152 which reduces the pressure of the fluids present in the flow conductor to a desired value, for example 30 pounds per square inch, whereas the fluid in the flow line may be pressures up to 500 or more pounds per square inch. From the regulator 152, a control fluid supply line 153 is connected with the inlet opening 154 of the valve body 130 for conducting the control fluid pressure into a side port or body opening 154 in the pilot valve body. A toggle valve 160 is disposed in an enlarged portion 156 of the port 154 and is biased into seated sealing engagement with a seat 157 at the inner end of said enlarged portion of the bore by a helical coil spring 158. The toggle valve 160 therefore prevents admission of control fluid from the supply line 153 into the body opening 155 of the pilot valve 130 until the valve is tilted off the seat 157 by means of the toggle arm or projecting stem 161 formed integral with the valve 160 and projecting into the body opening 155. The free end of the stem 161 is disposed in an external annular groove 162 formed in the central stem section 165 projecting upwardly from the operator piston 140. The operator piston has an external annular seal ring 141 thereon sealing with the wall of the cylinder bore 142 in which the piston is movable. The upper end of the stem portion 165 is provided with a flanged washer 170 which engages over a reduced projecting boss 171 in the stem and seats on a shoulder 172 formed between the boss and the external cylindrical portion of the stem. The washer or flange 170 is engaged by a helical coil spring 175 which is confined between the washer and the closed upper end 176 of the spring housing bore 177 of the valve body 130, and biases the piston 140 downwardly to the lower position shown in FIG. 5.

The cylinder bore 142 receives the control fluid pressure from the supply line 153 which passes the valve 160 when the same is open. The conduit 129 is connected to a port 137 communicating with the bore or body opening 155 so that the control fluid pressure entering such bore is directed through the port 137 to the conduit 129 and thence to the operator mechanism 120 of a motor safety valve 110 which is connected in the flow line 17 for controlling fluid flow therethrough. The safety valve 110 is normally open and is pressure closeable by control fluid pressure conducted from the bore of the flow conductor 17 through the port 150 and conduit 151 past the regulator 152, where the pressure is reduced, and thence through the supply line 153 to the toggle valve 160. When the tubular pilot probe 83 is damaged to such an extent that the integrity of the probe and the closed chamber 145 is destroyed, the fluid pressure of the fluids within the flow conductor 17 may enter the bore thereof and pass upwardly therethrough and through the bore 72 of the bushing 70 to act on the lower end of the piston 140, the force of the fluid pressure being substantially greater than the force of the spring 175 will move the piston upwardly and the toggle valve stem 161 will be engaged by the shoulders of the groove 162 in the stem portion of the operator piston to swing the toggle valve 160 to tilt and open the same and permit the operating or control fluid from the supply line 153 to pass into the bore 155 of the pilot valve body and thence through the port 137 and the conduit 129 to the diaphragm housing 120 of the motor safety valve 110. Since the control fluid pressure in the valve body opening 155 of the pilot valve 130 has been reduced to a value substantially below the pressure of the fluids flowing through the flow conductor 17, the piston 140 will be moved upwardly against the force of the spring 175 to maintain the toggle valve 160 in open position, and maintain a supply of control or operating fluid pressure through the conduit 129 to the diaphragm operator 120 of the motor valve 110 and so maintain the motor safety valve in closed position.

A suitable valve upstream from the motor valve 110 and the pilot valve and probe may be used to close off the flow of fluids in the conductor 17 to the pilot valve probe and safety valve 110, whereupon the pilot valve 130 may be disconnected from the conduits 129 and 153 and rotated to disengage the threads 131 from within the threads 132 of the collar 133 and withdraw the damaged sensing probe from within the flow conductor. The damaged tubular metallic-sensing probe body member 83 may be replaced by a new sensing probe body member clamped between the ferrule 76 and the seat 75 of the bushing 70, whereupon the probe may be reinserted through the opening 90 and the pilot valve 130 again made up in the coupling 133 and the control fluid lines connected to the pilot valve, whereupon the cutoff valve upstream in the flow line 17 may be opened and the system again placed in operation until the occurrence of another damaging condition which renders the probe ineffective to close off admission of fluid pressure from within the flow line 17 to the pilot valve.

It is also readily apparent that the tubular probe body members 63 or 83 may be formed of plastic or other suitable material, and that the plug 84 may be made of Cerro-metal, epoxy, plastic or other heat-responsive material, whereby, when the probe is exposed in a stream of flowing fluid in a flow conductor in which the temperature of the flowing fluid has been elevated to an undesirable degree or value, the plug or probe will melt or fuse and open the bore of the probe body 63 or 83 to permit fluid pressure to enter the pilot valve and actuate the same to operate the safety valve to close off further flow through the conductor. Likewise, the plug 84 may be of a material which is sensitive to acids, alkali or other erosive or corrosive materials present in the flow stream and would be dissolved or corroded sufficiently to destroy the integrity of the closed chamber 52 and permit the pilot valve to actuate the safety valve upon the occurrence of such undesirable condition.

It will be seen, therefore, that an improved pilot valve sensing probe and safety valve system have been disclosed for sensing corrosive abrasive or erosive conditions in a stream of fluids flowing through a flow conductor and to set into action a pilot valve for controlling the admission of control or operating fluid to a safety-valve-operating piston or diaphragm for moving the safety valve to closed position to close off flow of fluids through the flow conductor in the event of damage or destructive of the probe as a result of undesired conditions of temperature, erosion, abrasion or corrosion occurring on the sensing probe caused by the fluids flowing through the flow conductor.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A motor safety valve having actuator means for moving the closure means of said safety valve between open and closed positions and connected in a flow line conducting fluids through said valve; a pilot valve connected to said flow line; conductor means from a source of pressure fluid to the pilot valve and from the pilot valve to the actuator means of the motor safety valve for conducting such pressure fluid to the actuator means of the motor safety valve to operate the safety valve; said pilot valve having control valve means controlling flow of such pressure fluid from said source of pressure fluid to the actuator means of the motor safety valve; control valve operator means in said pilot valve responsive to line fluid pressure in said flow line to move said control valve means to control flow of pressure fluid from said source of pressure fluid through the pilot valve to the actuator of the motor safety valve; and probe means exposed to line fluids flowing through the flow line and responsive to abrasive, corrosive or erosive elements in such line fluids to decay sufficiently to admit line pressure fluid from the flow line in which it is exposed to the pilot valve for actuating the control valve operator means to actuate said control valve means controlling the flow of pressure fluid from the source of pressure fluid to the motor safety valve actuator means for controlling operation of said motor safety valve between open and closed positions.

2. A device of the character set forth in claim 1, wherein said probe means exposed in said flow line to be acted upon by the line pressure fluids flowing through the flow line comprises: an elongate imperforate tubular member closed at one end and open at the other end; and means for mounting said tubular member in a position with its open end communicating with the pilot valve for conducting fluid pressure from the flow line to the pilot valve to actuate the same upon the occurrence of a predetermined condition of decay destroying the integrity of the imperforate tubular-sensing probe.

4. A device of the character set forth in claim 2 wherein said probe means comprises: an elongate tubular metallic body member; a closure plug closing said closed end of said body member; means at the other end of said body member for attaching the same to said pilot valve; the length of the body member being sufficient to extend substantially into said flow line to which the pilot valve is connected for exposure of the body member to the line fluids flowing through the flow line.

5. A device of the character set forth in claim 4 wherein: said elongate tubular probe body member is formed of a length of tubular metallic material having a plug soldered in one end to provide said closed end, and having its opposite open end flared for connection to a fitting communicating with the pilot valve.

6. A device of the character set forth in claim 2 wherein: the elongate imperforate tubular member, the closed end thereof, and means for mounting the same are formed of an integral body of material.

8. The combination of a motor safety valve for controlling flow through a flow line having means for connecting it to a flow line; a pilot valve having means for connecting it to said flow line and having conduit means communicating with the operator mechanism of the motor safety valve and with a source of pressure fluid for actuating said operator mechanism of said safety valve, said pilot-valve controlling flow of said actuating fluid to and from the operator mechanism of the motor safety valve, said pilot valve having means providing a chamber therein with a pressure-actuated valve-actuating means responsive to line fluid pressure in said chamber for actuating said pilot valve means for controlling flow of said actuating fluid to and from said motor safety valve; and a sensing probe connected with said pilot valve and having a tubular body member projecting from said pilot valve into the flow passage of the flow line for exposure to fluids flowing through the line and comprising said means connecting said pilot valve to said flow line; said probe body member having one end closed and its opposite end communicating with the chamber of said pilot valve, said probe body member forming with said chamber of said pilot valve a closed chamber; said probe body member while maintained in an integral condition preventing entry of line fluid to said chamber and thus preventing undesired actuation of said pilot valve actuating means, said probe, when damaged by abrasive, corrosive or erosive materials in the fluids flowing through the flow line and impinging against the probe body member to destroy the integrity of the tubular body member, admitting the line pressure fluid to the chamber of the pilot valve to actuate the pilot valve to operate the motor safety valve to cause the same to move to closed position to close off flow through the flow line.

9. In combination: a normally open resiliently closeable safety motor valve having a fluid pressure responsive actuator connected in a flow line; a pilot valve having fluid flow communication with the actuator of said safety motor valve for biasing said safety valve to open position by a control fluid pressure; valve means in said pilot valve for controlling the admission of said control fluid to said actuator of said safety motor valve; pressure responsive means in said pilot valve actuatable for releasing the pressure of the control fluid acting on the actuator of the safety motor valve; and probe means exposed to fluids flowing through the flow line responsive to abrasive, corrosive or erosive elements in the fluids flowing through said flow line to decay sufficiently to admit line pressure fluid from the flow line in which it is exposed to the pilot valve pressure responsive means for actuating the pilot valve means to release the control fluid pressure acting on the motor safety valve actuator to permit the safety valve to be resiliently moved to closed position.

10. A normally open motor safety valve having actuator means for moving the closure means of said safety valve to closed position by fluid pressure, said safety valve being connected in a flow line conducting fluids through said valve; a pilot valve connected to said flow line; conductor means from the flow line to the pilot valve and from the pilot valve to the actuator means of the motor safety valve for conducting line fluid pressure from the flow line to the actuator means of the motor safety valve to close the safety valve; said pilot valve having control valve means normally closed to prevent flow of line fluid pressure from the flow line to the actuator means of the motor safety valve; control valve operator means in said pilot valve responsive to line fluid pressure in said flow line to move said control valve means to open position to admit line fluid pressure from the flow line through the pilot valve to the actuator of the motor safety valve; and probe means exposed in the flow line and connected to the pilot valve for controlling the admission of line fluid pressure from the flow line to the control valve operator means of the pilot valve and responsive to abrasive, corrosive or erosive elements in the line fluids to decay sufficiently to admit line fluid pressure from said flow line to the pilot valve to act on said control valve operator means to open said control valve to permit line fluid pressure to flow past said control valve to the actuator of said motor safety valve to close said motor safety valve.

* * * * *

PO-1050
(5/69)

UNITED STATES PATENT OFFICE
CERTIFICATE OF CORRECTION

Patent No. 3,630,216      Dated December 28, 1971

Inventor(s) Warner M. Kelly

It is certified that error appears in the above-identified patent and that said Letters Patent are hereby corrected as shown below:

Column 2, line 37, for "of" read --or--

Column 4, line 4, delete "has" (second occurrence)

Column 6, line 9, after "corrosive" insert --,-- line 16, for "destructive" read --destruction--

Add Claims 3 and 7 which follow, as allowed:

3. A sensing probe of the character set forth in Claim 2 wherein said probe means comprises: an elongate tubular metallic body member; a closure plug closing said closed end of said body member; means at the other end of said body member for attaching the same to said pilot valve; the length of the body member being sufficient to extend substantially into said flow line to which the pilot valve is connected for exposure of the body member to the line fluids flowing through the flow line.

7. A sensing probe element of the character set forth in Claim 2 wherein: the means for mounting same is detachably connected with the open end of said tubular member, and said mounting means is provided with means for connecting said mounting means with said pilot valve.

Signed and sealed this 21st day of November 1972.

SEAL)
ttest:

DWARD M.FLETCHER,JR.
ttesting Officer

ROBERT GOTTSCHALK
Commissioner of Patents

Disclaimer and Dedication 3,630,216.—*Warner M. Kelly*, Houston, Tex. CONDITION-SENSING SAFETY VALVE DEVICES. Patent dated Dec. 28, 1971. Disclaimer and dedication filed Apr. 11, 1974, by the assignee, *Otis Engineering Corporation.*

Hereby disclaims and dedicates to the Public the remaining term of said patent.

[*Official Gazette June 25, 1974.*]